United States Patent [19]

Nakagawa et al.

[11] 4,419,128
[45] Dec. 6, 1983

[54] CONTINUOUS MELTING, REFINING AND CASTING PROCESS

[75] Inventors: Ryuichi Nakagawa, Seki; Shiro Yoshimatsu, Tokyo; Akira Fukuzawa, Funabashi; Akira Sato; Tsuyoshi Ozaki, both of Ohmiya, all of Japan

[73] Assignee: National Research Institute for Metals, Tokyo, Japan

[21] Appl. No.: 358,908

[22] Filed: Mar. 17, 1982

[51] Int. Cl.³ .............................................. C21C 5/32
[52] U.S. Cl. ......................................... 75/46; 75/13; 75/48; 75/56; 75/60
[58] Field of Search .................... 75/13, 46, 48, 56, 60

[56] References Cited

U.S. PATENT DOCUMENTS

3,960,547  6/1976  Kirkpatrick et al. .................. 75/46

Primary Examiner—M. J. Andrews
Attorney, Agent, or Firm—Sherman & Shalloway

[57] ABSTRACT

In a continuous melting, refining and casting process which comprises, substantially in series, a step of melting and carburizing steel scrap, iron scrap and/or reduced iron as a raw material in a combustion-type melting furnace, a refining step by blowing of oxygen, a refining and holding step and a continuous casting step, the improvement wherein an intermediate holding step in a holding furnace is provided between the melting and carburizing step and the refining step so that the molten metal tapped from the melting furnace is held in the intermediate holding furnace for a certain period of time and continuously fed to the refining step at a predetermined flow rate, and wherein the refining conditions in the refining step are controlled according to one or more characteristics of the molten metal in the intermediate holding step.

19 Claims, 5 Drawing Figures

CONTINUOUS MELTING, REFINING AND CASTING PROCESS

This invention relates to a continuous melting, refining and casting process using steel scrap, iron scrap and reduced iron as raw materials.

Methods have previously been known to regenerate steel from steel scrap or produce steel from reduced iron using an electric arc furnace. These methods involving the use of electric arc furnaces, however, present many problems in continuous melting, refining and casting. For example, they require large power consumption and are likely to cause a great deal of pollution such as soots, dusts, noises, etc. Their productivity is low because they are operated batchwise. Moreover, since the oxygen blowing conditions in the refining step are restricted, it is impossible to select refining conditions which correspond to the quality of a scrap to be charged.

In an attempt to overcome these problems, we previously invented a process for continuously producing steel from steel scrap or reduced iron which comprises a step of continuously melting and carburizing steel scrap or reduced iron as a raw material in a low-frequency induction furnace, followed by an oxygen blowing step and a grading step (U.S. Pat. No. 4,023,962), and thus contributed to the advance of a continuous melting, refining and casting process ranging from the melting of steel scraps and reduced iron to casting.

The process involving the use of a low-frequency induction furnace has become economically disadvantageous in recent years because of a rise in the cost of electric power which is caused by the increased cost of petroleum. In order to cope with this situation, we have made extensive investigations about the possibility of solving this problem by substituting a combustion-type melting furnace using coal or coke as a direct burning source for the low-frequency induction furnace used in the melting and carburizing step of the above-cited prior patent. These investigations have led to the present invention.

It is an object of this invention to provide a continuous melting, refining and casting process in which the use of a combustion-type melting furnace for melting raw materials markedly reduces the cost of energy.

Another object of this invention is to provide a process for continuously producing steel, in which the flow rate, temperature and chemical composition of the molten metal are kept stable in spite of the adoption of a combustion-type melting furnace.

Still another object of this invention is to reduce the cost of energy further by recycling a large quantity of carbon monoxide generated in the refining step to a combustion-type melting furnace, a holding furnace, etc. for reuse as a fuel.

These objects are achieved in accordance with this invention by a continuous melting, refining and casting process which comprises, substantially in series, a step of melting and carburizing steel scrap, iron scrap and/or reduced iron as a raw material in combustion-type melting furnace, a refining step by blowing of oxygen, a refining and holding step and a casting step, characterized in that an intermediate holding step is provided between the melting and carburizing step and the refining step so that the molten metal charged from the melting furnace is held in the holding furnace for a while and continuously fed to the refining step at a predetermined flow rate, and in that the refining conditions in the refining step are controlled according to one or more characteristics of the molten metal in the intermediate holding step.

Figure 1:
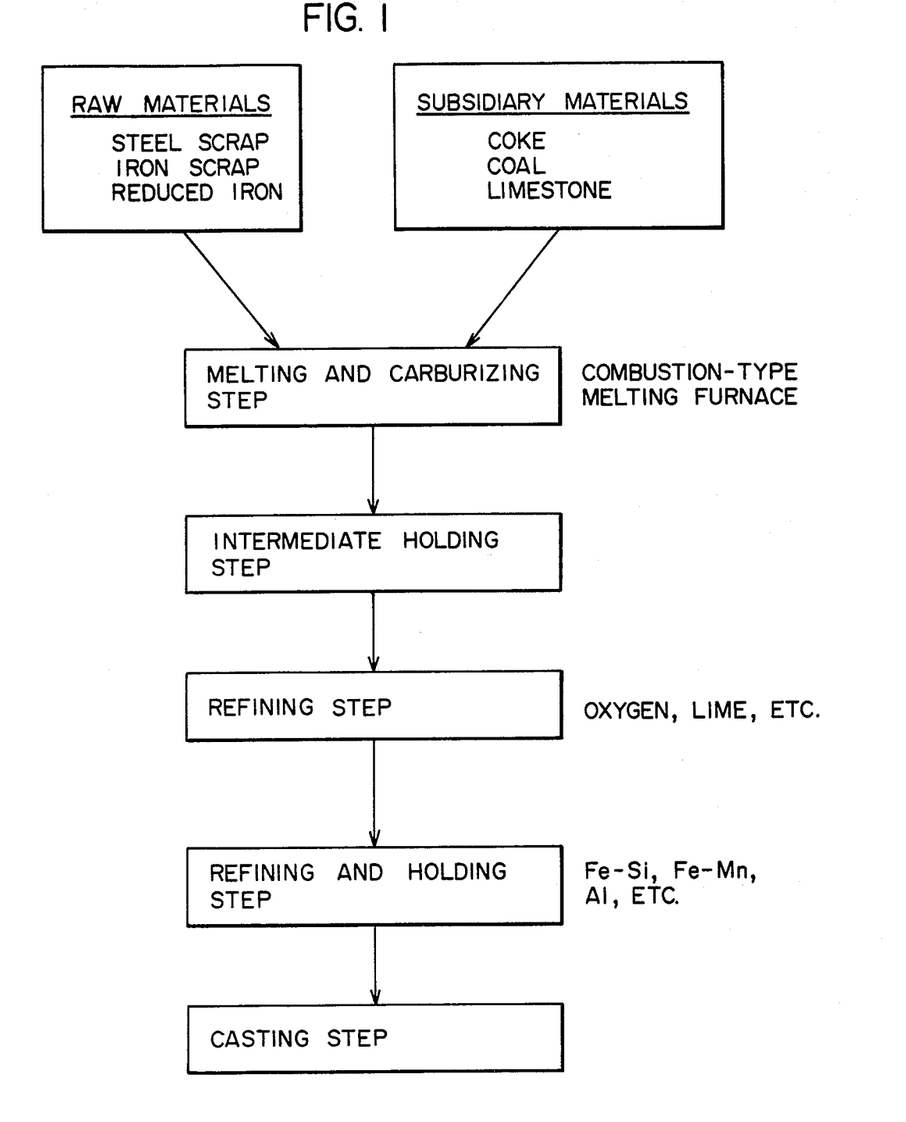
FIG. 1 is a basic flow sheet of the process of this invention.

Basically, the process of this invention comprises, in series, the steps shown in FIG. 1.

The "combustion-type melting furnace", as used in this invention, denotes a furnace for melting a raw material such as steel scrap by the heat of burning of a carbonaceous material such as coke, coal or hydrocarbons, and includes, for example, a cupola and a reverberatory furnace. The cupola is most suited for the melting and carburizing step of the process of this invention because it is suitable for melting and carburizing the raw material and relatively simple in structure and proves to be excellent from the stand-point of heat economy.

Steel scrap, iron scrap and reduced iron are used as raw materials in the process of this invention. The steel scrap may, for example, be steel scraps of large-sized heavy-duty articles such as automobiles, refrigerators and electric washers. Examples of iron scrap are the cylinder blocks of automobiles and return scraps.

Although the combustion-type melting furnace requires less energy costs than electric furnaces such as a low-frequency induction furnace, it has the disadvantage that the flow rate, temperature and chemical composition of the molten metal inevitably vary in a short cycle and a long cycle. For this reason, it has previously been difficult to use a combustion-type melting furnace with a view to carrying out continuous casting. The short cyclic variations means variations in the flow rate, temperature and chemical composition of the molten metal moving through the steps, which occur within a short period (incessant fluctuations); since these variations are due mainly to the layer-by-layer charging of an iron source/coke in the cupola, they cannot be avoided. The long cyclic variations denote variations in these factors within a period of several tens of minutes to several hours. In the cupola, these variations occur incident to changes in the condition of the furnace owing to the change of the height of the bed coke, the unusual blow of air near the tuyere, and the corrosion of the furnace wall refractory. Even when such variations are noticed and a countermeasure is taken, the condition of the furnace, in many cases, cannot be restored to the original one until a period of several hours elapses.

In a continuous melting, refining and casting process using a combustion-type melting furnace, it is essential to reduce these short and long cyclic variations of the flow rate, temperature and chemical composition of the molten metal to such an extent that they do not affect the quality of the final casting. This has been achieved for the first time by the process of this invention.

In the melting and carburizing step of this invention, the steel scrap, iron scrap, and/or reduced iron is melted and carburized simultaneously in the combustion-type melting furnace.

The molten metal produced in the melting and carburizing step is then transferred to the intermediate holding step. In the intermediate holding step, an intermediate holding furnace such as a channel-type low-frequency induction furnace is used. If desired, a flow rate controlling furnace may also be used in the holding step. Since full mixing of the molten metal in the intermediate holding furnace is required, a furnace equipped with means for uniformizing the temperature and chemical composition of the molten metal, for example means for induction stirring or gas blowing, is preferred to a piston-flow-type furnace. Where pre-elimination of SI is desired, oxygen or a gas containing oxygen may be blown at this stage. The residence time of the molten metal in the intermediate holding step may be relatively short when the raw material has a relatively uniform chemical composition and shape, but should be relatively long when the raw material has a relatively non-uniform chemical composition and shape. Generally, by adjusting the residence time of the molten metal to 0.3 to 2 hours, preferably to 0.3 to 1 hour, the variations in the flow rate, temperature and chemical composition of the molten metal can be considerably reduced. If the residence time is less than 0.3 hour, the aforesaid reducing action is insufficient. When it exceeds 2 hours, no additional effect can be obtained, and the temperature of the molten metal undesirably decreases. Where a flow rate controlling furnace is additionally used in the intermediate holding step, the residence time of the molten metal in the intermediate holding step denotes the sum of the residence time in the intermediate holding furnace and the residence time in the flow rate controlling furnace in operation. When the molten metal from the cupola has an especially high S content, a desulfurization tank may be provided to perform preliminary removal of Si and preliminary removal of S in the intermediate holding step.

In order to feed the molten metal continuously at a fixed flow rate from the intermediate holding step to the refining step, it is preferred to provide the flow rate controlling furnace. The flow rate controlling furnace may be of any desired type which can permit feeding of the molten metal at a fixed flow rate. For example, it is suitable to provide two unit flow rate controlling furnaces having a known relation between the inclination angular speed and the rate of the flowing molten metal between the intermediate holding furnace and the refining furnace, and operate them alternately. The accuracy of controlling the flow rate of the molten metal is generally within ±10%, preferably within 5%. Flow rate control having a higher accuracy is required as the hold-up weight of the molten metal in the refining furnace becomes smaller. Besides the aforesaid flow rate controlling furnace of the type adapted for controlling the flow rate by the inclination angular speed, there can also be used flow rate controlling furnaces adapted for flow rate control by weight control and/or liquid surface control by such means as a nozzle stopper, a sliding gate valve, a nozzle head or an electro-magnetic channel, or by a pneumatic including vacuum liquid surface controlling method.

The extent of variations in the flow rate, temperature and chemical composition of the molten metal can be reduced considerably in the intermediate holding step by the process of this invention. The remaining long cyclic variations can be effectively eliminated by controlling the refining conditions in the refining step according to one or more characteristics of the molten metal in the intermediate holding step.

The characteristics of the molten metal which are measured in the intermediate holding step are the flow rate, temperature and chemical composition of the molten metal. The chemical composition of the molten metal is measured by measuring the Si content, C content, P content, S content, etc. For the measurement of the characteristics of the molten metal, the molten metal is sampled from the output of the intermediate holding furnace, at intervals of 3 to 30 minutes, preferably 3 to 10 minutes. The variations in the temperature of the molten metal are controlled mainly by the amount of cooling agents put in the refining furnace, and the variations in the amounts of Si and C are controlled mainly by the amount of oxygen blown in the refining furnace. Iron oxide performs a dual function of a cooling agent and an oxygen supplier and makes it possible to control both the temperature and chemical composition of the molten metal to the desired levels. The content of P can be adjusted to the desired value by varying the amount of a dephosphorizing agent such as lime or sodium carbonate. The amount of S may be adjusted by changing the amount of a desulfurizing agent as required.

The residence time of the molten metal in the refining furnace varies depending upon the Si content of the molten metal. Generally, it is 0.1 to 0.7 hour, preferably 0.1 to 0.5 hours. Where the molten metal has an especially high Si content, two unit refining furnaces may be used in series. In this case, the residence time is the sum of the residence times in the two furnaces. If the residence time is less than 0.1 hour, the variations in the characteristics of molten metal can be removed only insufficiently. If it exceeds 0.7 hour, no particular effect is obtained.

The amount of oxygen to be blown in the refining furnace is 5 to 10% higher than the amount stoichiometrically required to oxidize the components of the input molten metal. When the content of C in the refined molten metal is lower than the desired value, the balance may be made up for in the subsequent refining and holding step, thus making it possible to adjust the content of C easily.

Waste gases containing CO generated by oxygen blowing in the refining step may be recycled to the melting and carburizing step for use as a fuel, and/or for preheating the charges and air. They may also be used as a fuel for keeping the temperature of the holding furnace. Hence, the cost of energy required in the process of this invention is much lower than that in the prior processes.

In the process of this invention, the refining and holding step is performed subsequent to the refining step. By adjusting the residence time in the refining and holding step to 0.5 to 3 hours, preferably 0.5 to 2 hours, molten metal having very much reduced extents of variations can be continuously fed to the subsequent continuous casting step. In the refining and holding step, the flow rate, temperature and chemical composition of the molten metal are finally controlled to optimal values for the subsequent continuous casting step. Specifically, these factors may be controlled by tilting the refining and holding furnace by a very small angle, induction heating, or adding alloy elements required depending upon the chemical composition, such as ferrosilicon, metallic silicon, ferromanganes and graphite, respectively. If desired, a transfer channel may be provided between the refining furnance and the refining and holding furnace to perform deoxidation therein. The residence time in the transfer channel is included in the residence time in the refining and holding step. It is also possible to measure the temperature and C content of the molten metal in the transfer channel and control the refining conditions in the refining furnace according to the measured values. If the residence time in the refining and holding step is less than 0.5 hour, the controlling of the characteristics of the molten metal becomes undesirably insufficient. No additional effect can be obtained even when the residence time exceeds 3 hours.

As stated hereinabove, the characteristic feature of the continuous melting, refining and casting process of this invention is that the variations in the flow rate, temperature and chemical composition of molten metal which occur owing to the use of the combustion-type melting furnace can be effectively eliminated by combining the melting and carburizing step, the intermediate holding step, the refining step and the refining and holding step. The total residence time of the molten metal in the intermediate holding step, the refining step and the refining and holding step is preferably 0.9 to 5 hours. If it is less than 0.9 hour, the aforesaid variations cannot be fully eliminated. If it is longer than 5 hours, no additional effect can be obtained and such a long residence time is disadvantageous from the standpoint of heat economy.

The following example illustrate the present invention more specifically.

EXAMPLE

Figure 2:
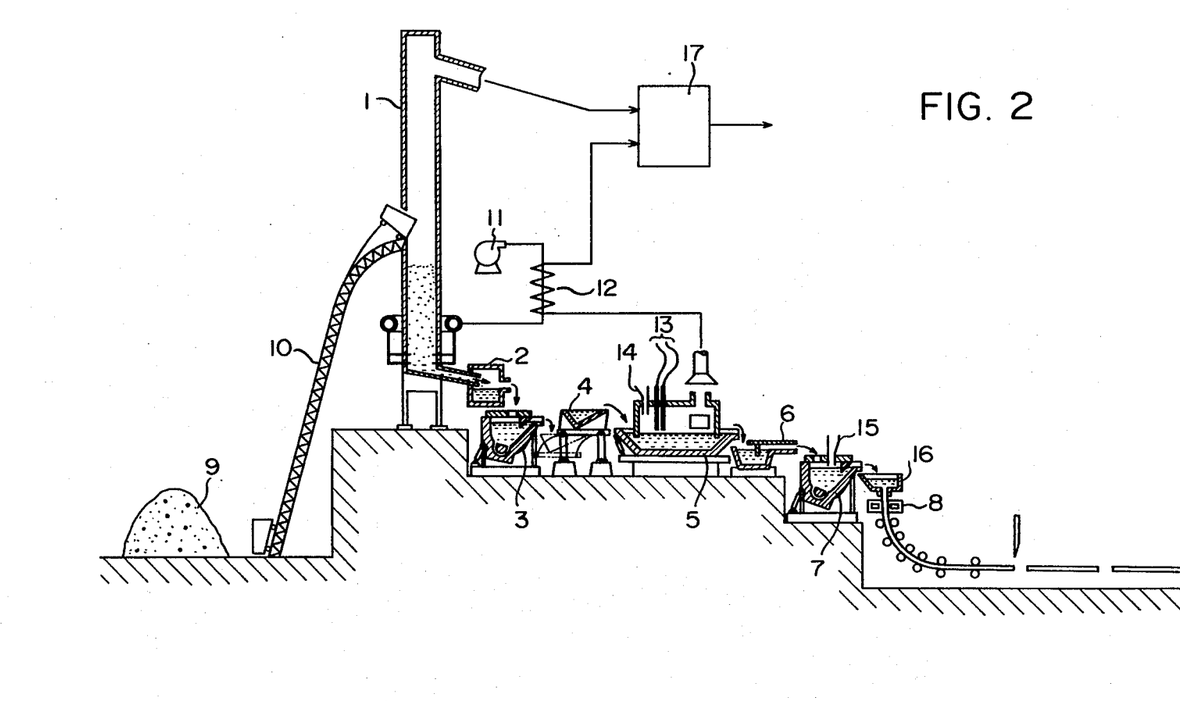
FIG. 2 is a detailed flow sheet of the process of this invention.

A blast cupola having two stages of tuyeres was used in melting and carburizing 100% automobile scrap as a raw material, and the process of this invention was carried out by using an apparatus including the various devices shown in FIG. 2 of the attached drawings in order to produce carbon steel for machine structures (corresponding to JIS-S20C; containing 0.15 to 0.25% of C, 0.15 to 0.40% of Si, 0.30 to 0.60% of Mn, less than 0.035% of P and less than 0.040% of S).

As shown in FIG. 2, the apparatus used included a combustion-type melting furnace 1 in which the melting and carburizing step was carried out; a desulfurizing tank 2, an intermediate holding furnace 3 and a flow controlling furnace 4 which were used to perform the intermediate holding step; a refining furnace 5 in which the refining step was performed; a transfer channel 6 and a refining and holding furnace 7 which were used to perform the refining and holding step; and a casting device 8 coupled to the refining and holding furnace 7 and used to carry out the casting step. The devices 1 to 7 are connected to each other in series. In FIG. 2, the reference numeral 9 represents a raw material yard; 10, a bucket elevator; 11, an air blower; 12, a heat exchanger; 13, oxygen blowing lances; 14, an opening for charging the scrap; 15, a chute for alloying elements; and 16, a tundish.

The scrap used as the raw material contained 0.10 to 0.18% of C, 0.01 to 0.95% of Si, 0.01 to 0.50% of Mn, 0.013 to 0.035% of P and 0.016 to 0.040% of S.

The capacities of the individual devices and the operating conditions therein are shown below.

A. Melting and Carburizing Step
Combustion-type furnace (cupola)
Charges:
  Steel scrap: 100%
  Coke ratio: 12%
  (fixed carbon 89%, S 0.62%, ash 5.8%)
  Limestone: 5%
  Dolomite and others: 2%
Air blowing temperature: 400° C.
Rate of air blown: 750 Nm$^3$/ton-pig iron
Output rate of molten metal: 18 tons/hour
Analysis of the furnace top gas: $CO_2$ 8.5%, CO 20%

B. Intermediate holding step
(1) Desulfurizing tank
  Type: gas-stirred tank (Ar or $N_2$)
  Hold-up weight: 2 tons
  Desulfurizer: calcium carbide
(2) Intermediate holding furnace
  Type: channel-type low-frequency induction furnace
  Capacity: 400 KW
  Hold-up weight: 20 tons
  Tap opening: siphon type
  Tilting device: hydraulic type
(3) Flow rate controlling furnace
  Type: constant angular velocity type
  Hold-up weight: 1.5 tons
  Tilting device: hydraulic type C. Refining step
Refining furnace
  Type: Oxygen top blowing channel-type steelmaking furnace
  Hold-up weight: 4.5 tons
  Amount of oxygen blown: 35 Nm$^3$/ton (two lances)
  Amount of limestone added: 20 kg/ton
  Amount of steel scrap added: 20 kg/ton D. Refining and holding step
(1) Transfer channel
  Amount of aluminum as a deoxidizer: 1 kg/ton
  Hold-up weight: 1 ton
(2) Refining and holding furnace
  Type: Channel type low-frequency induction furnace
  Capacity: 600 KW
  Hold-up weight: 30 tons
  Device for adding alloy elements (optional type)
  Tilting device: hydraulic type E. Casting step
Casting device
  Casting speed: 3.5 m/min.
  Cross section of a cast product: 12×12 cm In operation, after the starting of tapping of the molten metal from the melting and carburizing furnace, the molten metal was introduced into the intermediate holding furnace. An electric current was passed through the intermediate holding furnace, and when the amount of the molten metal which resided in it reached 20 tons, 7 tons out of it was withdrawn into the refining step. Simultaneously, oxygen blowing in the refining furnace was started. About 10 minutes later, steady feeding of the molten metal from the intermediate holding step was started, and the refining furnace also set in continuous operation. Then an electric current was passed though the refining and holding furnace. In the refining and holding furnace, the chemical composition and temperature of the molten metal were adjusted while the amount of the molten metal held there was in the range of 20 to 30 tons, and then the feeding of the molten steel so adjusted to the casting device was started. A period of about 1 hour was required from the starting of continuous flowing of the molten metal until the entire system was maintained in a steady state. The steel obtained during start-up period was used as a return scrap, and the steel obtained after the steady state was reached was treated as a product.

Figure 3:
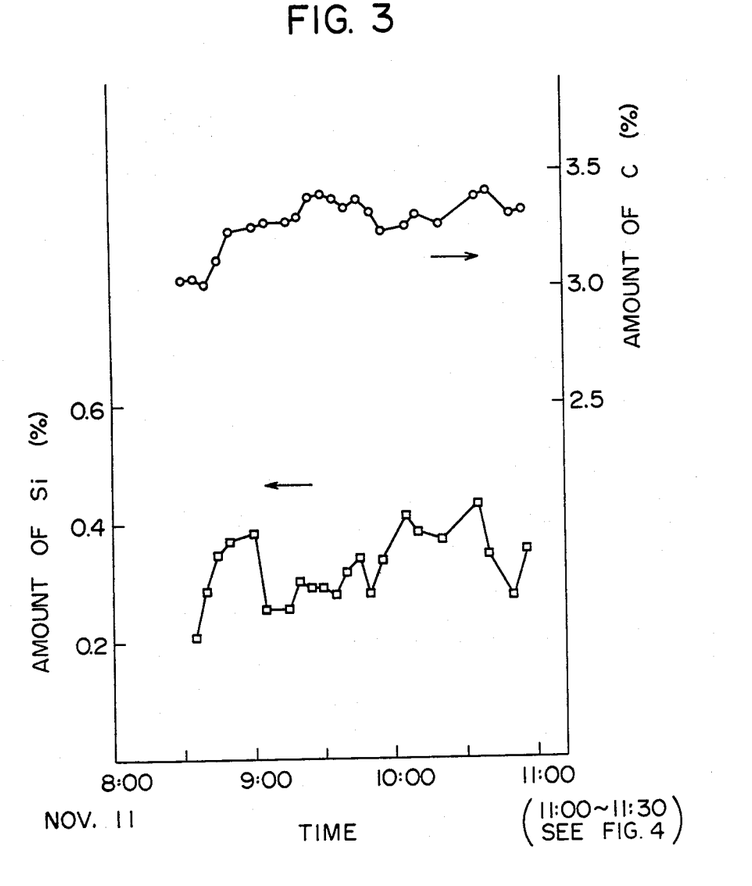
FIG. 3 is a graph showing long-term cyclic variations in the chemical composition of the molten metal from a combustion-type melting furnace.
Figure 4:
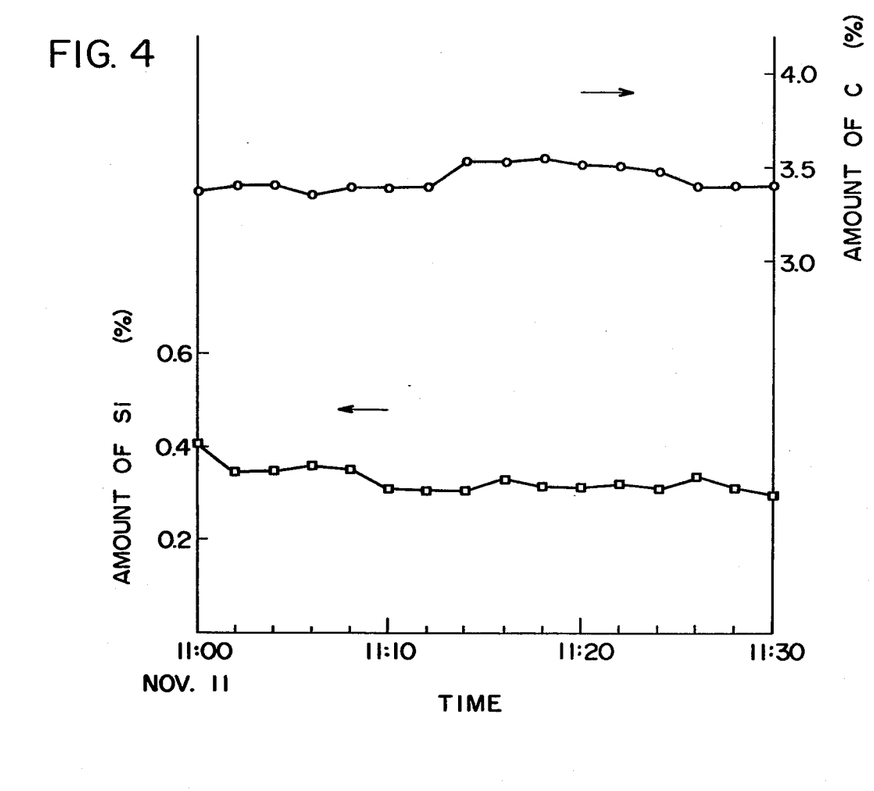
FIG. 4 is a graph showing short-term cyclic variations in the chemical composition of the molten metal from a combustion-type melting furnace.
Figure 5:
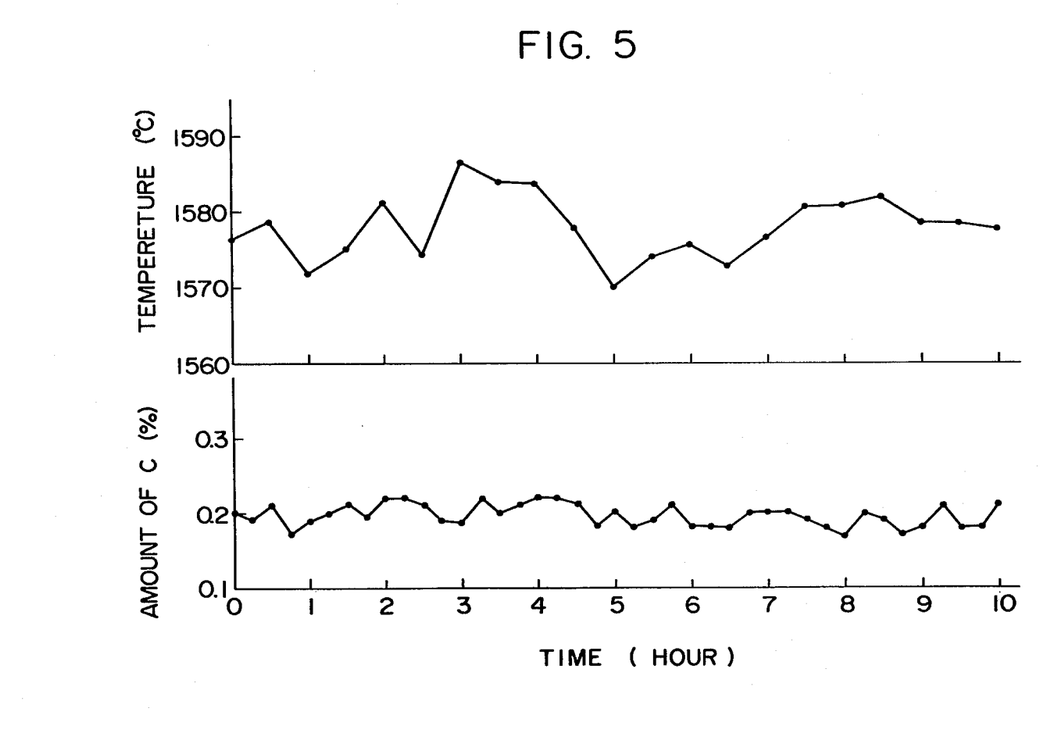
FIG. 5 is a graph showing variations in the characteristics of molten steel at the outlet of a refining furnace.

One example of long-term cyclic variations in the contents of C and Si in the molten metal at the exit of the combustion-type melting furnace is shown in FIG. 3, and one example of short-term cyclic variations in the contents of C and Si in the molten metal at the exit of the combustion-type melting furnace is shown in FIG. 4. The variations in the C content and temperature of the molten steel at the exit of the refining furnace are shown in FIG. 5.

Table 1 summarizes the experimental results obtained during the above steady-state operation. It is seen from Table 1 that the chemical composition, temperature and flow rate of the molten metal could be stabilized, and the molten metal could be fed stably to the subsequent casting step.

TABLE 1

| At the exit of each of the steps | Melting and carburizing | Intermediate holding | Refining | Refining and holding |
|---|---|---|---|---|
| Temperature of the melt (°C.) | 1440–1480 | 1430–1450 | 1570–1590 | 1575–1585 |
| C content (%) | 3.00–3.60 | 2.10–3.28 | 0.17–0.22 | 0.20 |
| Si content (%) | 0.20–0.44 | 0.27–0.35 | <0.02 | 0.26 |
| Mn content (%) | 0.28–0.47 | 0.36–0.41 | 0.23–0.25 | 0.33 |
| P content (%) | 0.06–0.10 | 0.07–0.09 | 0.02–0.03 | 0.024 |
| S content (%) | 0.012–0.028 | 0.010–0.014 | <0.012 | <0.012 |
| Flow rate (tons/hour) | 16.5–19.0 | 17.8–18.2 | 20.9–21.1 | 21 |

What we claim is:

1. In a continuous melting, refining and casting process for the production of steel from steel scrap, iron scrap and/or reduced iron by performing the following steps, substantially in series: a step of melting and carburizing steel scrap, iron scrap and/or reduced iron as a raw material in a combustion-type melting furnace, a refining step including oxidation by gaseous oxygen, a refining and holding step, and a continuous casting step, the improvement which comprises
   using a cupola as the combustion type melting furnace for simultaneously melting and carburizing steel scrap,
   continuously charging the molten metal from the cupola to an intermediate holding step in a holding furnace,
   holding the molten metal in the holding furnace for a period of time sufficient to reduce variations in flow rate, temperature and chemical composition of the molten metal,
   continuously feeding the molten metal from the holding furnace to the refining step at a predetermined flow rate, and
   controlling the refining conditions in the refining step according to one or more of the characteristics of the molten metal in the intermediate holding step, whereby the variations in quality of the steel product can be controlled within narrow limits.

2. The process of claim 1 wherein the residence time of the molten metal is 0.3 to 2 hours in the intermediate holding step, 0.1 to 0.7 hour in the refining step and 0.5 to 3 hours in the refining and holding step.

3. The process of claim 1 which further comprises providing means in the holding furnace in the intermediate holding step for reducing non-uniformities in the temperature and chemical composition of the molten metal and using said means to reduce said non-uniformities.

4. The process of claim 1 which further comprises controlling the flow rate of the molten metal in the intermediate holding step by providing a flow-rate controlling furnace together with the holding furnace.

5. The process of claim 1 which comprises measuring the concentration of at least one of silicon and carbon in the molten metal in the intermediate holding step in order to control the refining conditions.

6. The process of claim 1 which comprises measuring the temperature of the molten metal in the intermediate holding step in order to control the refining conditions.

7. The process of claim 1 wherein the refining conditions being controlled are at least one of the amount of oxygen blown, the input rate of the steel scrap, and the input rate of iron oxide.

8. The process of claim 7 wherein the amount of oxygen blown in the refining step is controlled to an amount which is 5 to 10% larger than the amount of oxygen required stoichiometrically to oxidize the input components of the molten metal.

9. The process of claim 1 wherein the refining conditions in the refining step are controlled according to at least one of the temperature and C content of the molten steel at the exit of a refining furnace or a transfer channel.

10. The process of claim 1 which further comprises recycling carbon monoxide gas present in waste gases generated from the refining step as a fuel for the cupola and/or to pre-heat the raw material and air.

11. The process of claim 2 wherein the total residence time in the intermediate holding step, the refining step and the refining and holding step is from 0.9 to 5 hours.

12. The process of claim 7 wherein the refining conditions being controlled are controlled in response to the concentration of at least one of silicon and carbon and the temperature of the molten metal in the intermediate holding step.

13. The process of claim 12 wherein the amount of oxygen blown is controlled to an amount which is 5 to 10% larger than the amount of oxygen required stoichiometrically to oxidize the input components of the molten metal.

14. The process of claim 13 wherein the refining conditions in the refining step are further controlled in response to at least one of the temperature and carbon content of the molten steel at the exit of a refining furnace or a transfer channel.

15. The process of claim 1 wherein the characteristics of the molten metal from the output of the intermediate holding furnace which are used to control the refining conditions in the refining step are measured at intervals of from 3 to 30 minutes.

16. The process of claim 5 wherein the concentration of at least one of silicon and carbon is measured at intervals of from 3 to 30 minutes.

17. The process of claim 6 wherein the temperature of the molten metal is measured at intervals of from 3 to 30 minutes.

18. The process of claim 1 wherein the carbon content of the molten metal being continuously discharged from the cupola is increased by the melting and carburizing step to an amount of about 3%.

19. The process of claim 18 wherein the concentration range of carbon in the molten metal is continuously decreased after the melting and carburizing step until after the last refining step is about 0.2%.

* * * * *